(12) United States Patent
Kanas

(10) Patent No.: US 11,971,752 B2
(45) Date of Patent: Apr. 30, 2024

(54) DISPLAYS WITH FLEXIBLE PERIPHERAL DISPLAY PORTIONS

(71) Applicant: Hewlett-Packard Development Company, L.P., Spring, TX (US)

(72) Inventor: Derek Kyle Joseph Kanas, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 163 days.

(21) Appl. No.: 17/639,460

(22) PCT Filed: Nov. 11, 2019

(86) PCT No.: PCT/US2019/060730
§ 371 (c)(1),
(2) Date: Mar. 1, 2022

(87) PCT Pub. No.: WO2021/096481
PCT Pub. Date: May 20, 2021

(65) Prior Publication Data
US 2022/0291719 A1    Sep. 15, 2022

(51) Int. Cl.
G06F 1/16    (2006.01)
(52) U.S. Cl.
CPC .......... *G06F 1/1652* (2013.01); *G06F 1/1681* (2013.01)
(58) Field of Classification Search
CPC .................................................. G06F 1/1652
See application file for complete search history.

(56) References Cited

U.S. PATENT DOCUMENTS

| 6,222,507 B1 | 4/2001 | Gouko |
| 6,302,612 B1 | 10/2001 | Fowler et al. |
| 7,633,744 B2 | 12/2009 | Kuhn |

(Continued)

FOREIGN PATENT DOCUMENTS

| CN | 105528035 A | 4/2016 |
| GB | 2436039 A | 9/2007 |
| JP | 2005-004498 A | 1/2005 |

OTHER PUBLICATIONS

Jurrien, I., "Xiaomi foldable smartphone unfolds into a tablet device," LetsGoDigital, Available at <https://en.letsgodigital.org/smartphones/xiaomi-foldable-smartphone/>, retrieved on Sep. 30, 2019, 14 pages.

*Primary Examiner* — Lisa Lea-Edmonds
(74) *Attorney, Agent, or Firm* — Knobbe, Martens, Olson & Bear, LLP

(57) ABSTRACT

A computing device is described that includes a display assembly, a base assembly, and a main hinge to enable the display assembly to be closed against the base assembly, and to enable the display assembly to be opened apart from the base assembly. The display assembly includes a main display portion that overlaps the base assembly when the display assembly is closed against the base assembly and a peripheral display portion that extends past an edge of the base assembly. The computing device includes a display folding assembly to bend the peripheral display portion into a concealed position in response to the display assembly being closed against the base assembly, and to deploy the peripheral display portion into a viewable position in response to the display assembly being opened apart from the base assembly.

14 Claims, 4 Drawing Sheets

(56) References Cited

U.S. PATENT DOCUMENTS

| | | | |
|---|---|---|---|
| 8,432,331 B2 * | 4/2013 | Schilling | H04M 1/0247 |
| | | | 345/905 |
| 8,462,103 B1 | 6/2013 | Moscovitch et al. | |
| 8,539,705 B2 | 9/2013 | Bullister | |
| 9,696,760 B1 * | 7/2017 | Zhang | G06F 1/1652 |
| 11,500,421 B2 * | 11/2022 | Perelli | G06F 1/1696 |
| 2006/0082518 A1 | 4/2006 | Ram | |
| 2007/0097014 A1 | 5/2007 | Solomon et al. | |
| 2013/0120912 A1 * | 5/2013 | Ladouceur | G06F 1/1616 |
| | | | 361/679.01 |
| 2017/0192459 A1 * | 7/2017 | Zhang | G06F 1/1652 |
| 2018/0108330 A1 * | 4/2018 | Wallace | G06F 1/1652 |
| 2022/0163999 A1 * | 5/2022 | Perelli | G06F 1/1641 |
| 2022/0291719 A1 * | 9/2022 | Kanas | G06F 1/1616 |
| 2023/0009765 A1 * | 1/2023 | Chung | G06F 1/1616 |

\* cited by examiner

DISPLAYS WITH FLEXIBLE PERIPHERAL DISPLAY PORTIONS

BACKGROUND

Computing devices may be designed to have built-in displays. A display adds functionality to a computing device, but typically also adds bulk and weight to the computing device. There is therefore a trade-off between the size of the display screen and the amount of bulk added to the computing device. Computing devices may be designed to have high screen-to-body ratios with the aim of achieving the largest display screen for the least amount of added bulk.

DETAILED DESCRIPTION

Computing devices with built-in displays may be designed to have the greatest amount of screen space for the least amount of bulk added to the computing device. However, the size of a display screen of a computing device may be constrained by the size of the body of the computing device to preserve portability and form factor.

The present disclosure provides a display device for a computing device that offers a viewing space that is not constrained by the size of the body of the computing device. As described herein, a computing device that has main hinge to open and close the computing device has a flexible display with peripheral display portions that are actuated by rotation of the main hinge. The main hinge is connected to a display hinge assembly such that the peripheral display portions, which are bent into concealed positions when the computing device is closed, are deployed into viewable positions which extend the viewing space of the display screen when the computing device is opened. Thus, the computing device has a small form factor when closed, and has a large viewing space when opened for use. The area of the viewing space when the peripheral display portions are deployed may be greater than the area of any side of the body of the computing device when the computing device is closed.

Figure 1:
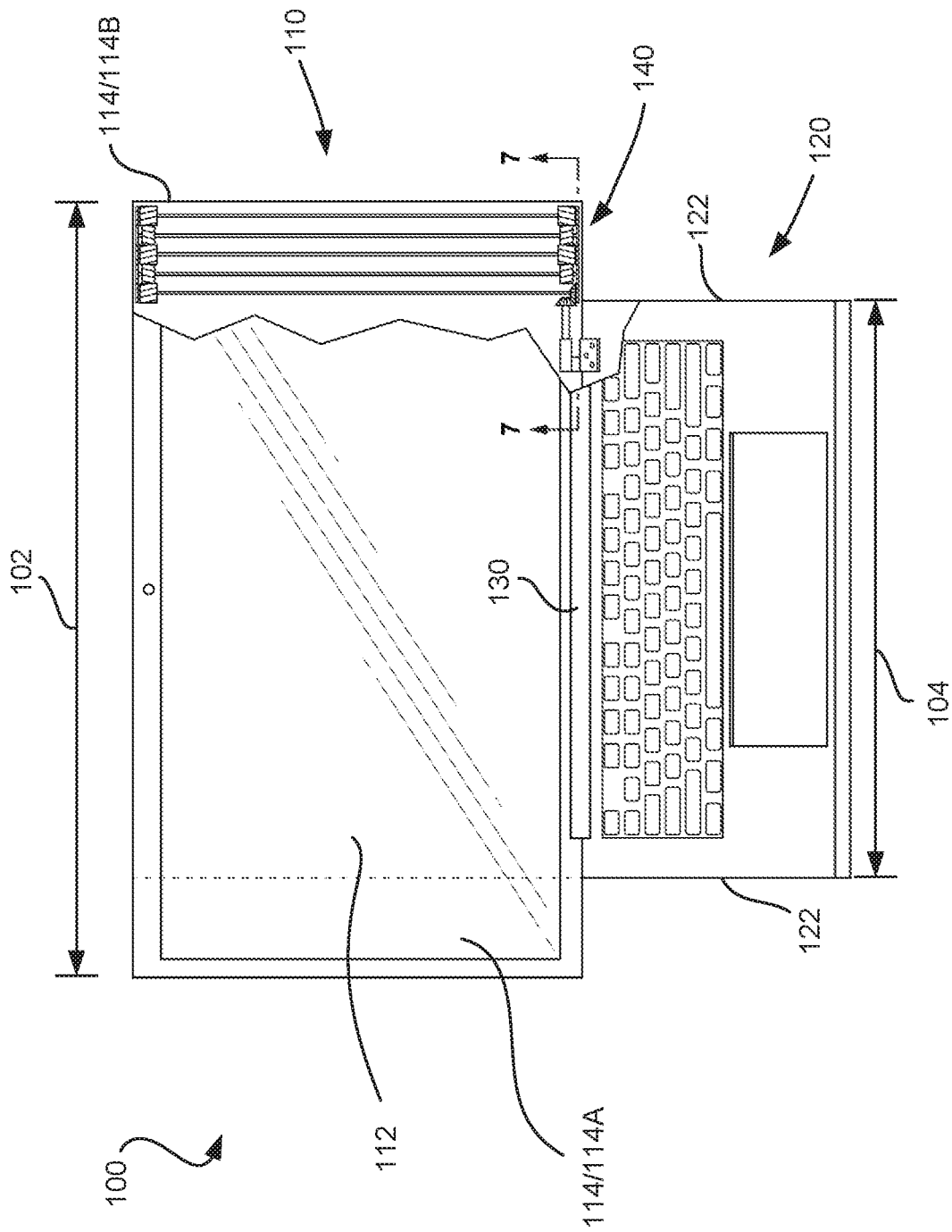
FIG. 1 is a front view of an example computing device with flexible peripheral display portions, with portions broken away to reveal details of a display folding assembly.

FIG. 1 depicts an example computing device 100 with flexible peripheral display portions 114A. Portions are broken away to reveal details of a display folding assembly 140.

The computing device 100 includes a display assembly 110 and a base assembly 120. The device assembly 110 includes a flexible display panel and associated electronics. The base assembly 120 may include an input device such as a keyboard, track pad, power button, or other input device, and associated electronics. The computing device further includes a main hinge 130 to enable the display assembly 110 to be closed against the base assembly 120 and to enable the display assembly 110 to be opened apart from the base assembly 120. In other words, the main hinge 130 is to enable the computing device 100 to be folded into a closed state and unfolded from the closed state into an open state. The computing device 100 may be a laptop computer, a tablet, a mobile phone, or any other mobile computing device that includes a display assembly 110 and a base assembly 120 connected by a main hinge 130 to open and close the computing device 100.

The display assembly 110 includes a main display portion 112 that overlaps side edges 122 of the base assembly 120 when the display assembly 110 is closed against the base assembly 120.

The display assembly 110 further includes peripheral display portions 114A, 114B that extend past side edges 122 of the base assembly 120. Thus, the peripheral display portions 114A, 114B extend a width 102 of the display assembly 110 to be greater than a width 104 of the base assembly 120. As shown, the display assembly 110 includes two peripheral display portions 114A, 114B on either horizontal side of the display assembly 110. That is, the display assembly 110 includes a first (i.e., left side) peripheral display portion 114A and a second (i.e. right side) peripheral display portion 114B, with the second peripheral display portion 114B situated on an opposite side of the main display portion 112 from the first peripheral display portion 114A. A dotted line through the display assembly 110 is shown dividing the peripheral display portion 114A from the main display portion 112.

Although two peripheral display portions 114A, 114B are shown on the left and right sides of the display assembly 110, in other examples, it is contemplated that the display assembly 110 may include a single peripheral display portion 114A, 114B, on either the left side (e.g. peripheral display portion 114A), right side (e.g. peripheral display portion 114B), or top side (not shown) of the display assembly 110.

The main display portion 112 and the peripheral display portions 114A, 114B form a flexible display panel which may be bent and unbent into different positions and/or orientations. Thus, the peripheral display portions 114A, 114B may be referred to herein as flexible peripheral display portions. The flexible display panel may be continuous from the main display portion 112 to the peripheral display portions 114A, 114B. The flexible display panel may be implemented using a flexible Organic Light Emitting Diode (OLED) display panel, an electronic paper display panel, or other flexible display panels.

The computing device 100 further includes a display folding assembly 140 to bend the peripheral display portions 114A, 114B into concealed positions in response to the display assembly 110 being closed against the base assembly 120. The display folding assembly 140 is further to deploy the peripheral display portions 114A, 114B into viewable positions in response to the display assembly 110 being opened apart from the base assembly 120. The peripheral display portions 114A, 114B are shown deployed in the viewable positions, parallel with the main display portion 112. In other words, the display folding assembly 140 is to align the peripheral display portions 114A, 114B with the main display portion 112 as the computing device 100 is unfolded from the closed state.

Although the peripheral display portions 114A, 114B in the viewable positions are shown parallel with the main display portion 112, it is contemplated that in some examples, the viewable positions may involve the peripheral display portions 114A, 114B being curved slightly inward or outward.

The display folding assembly 140 may include gears or other transmission mechanisms connected to the main hinge 130 to transfer rotation of the main hinge 130 to actuate a peripheral display portion 114A, 114B accordingly. In other words, the display folding assembly 140 may adjust orientations of a peripheral display portion 114A, 114B relative to the main display portion 112 based on movements of the main hinge 130.

The display folding assembly 140 shown actuates the peripheral display portion 114B. However, it is to be understood that the computing device 100 may include another display folding assembly to actuate the peripheral display portion 114A.

Figure 2A:
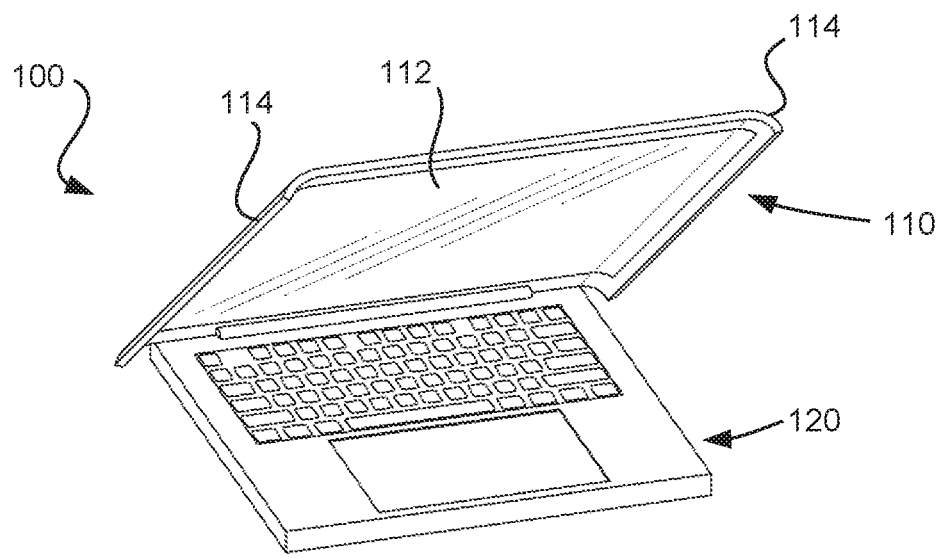
FIG. 2A is a perspective view of the example computing device of FIG. 1 with a display assembly that is tilted toward a base assembly.

FIG. 2A is a perspective view of the computing device 100 with the display assembly 110 tilted toward the base assembly 120. Thus, the computing device 100 is partly closed, as the computing device 100 would appear when the computing device 100 is in the process of being opened or closed. As the computing device 100 is closed, the peripheral display portions 114A, 114B are bent inward into the concealed positions. Alternatively, as the computing device 100 is opened, the peripheral display portions are deployed outward into the viewable positions.

Figure 2B:
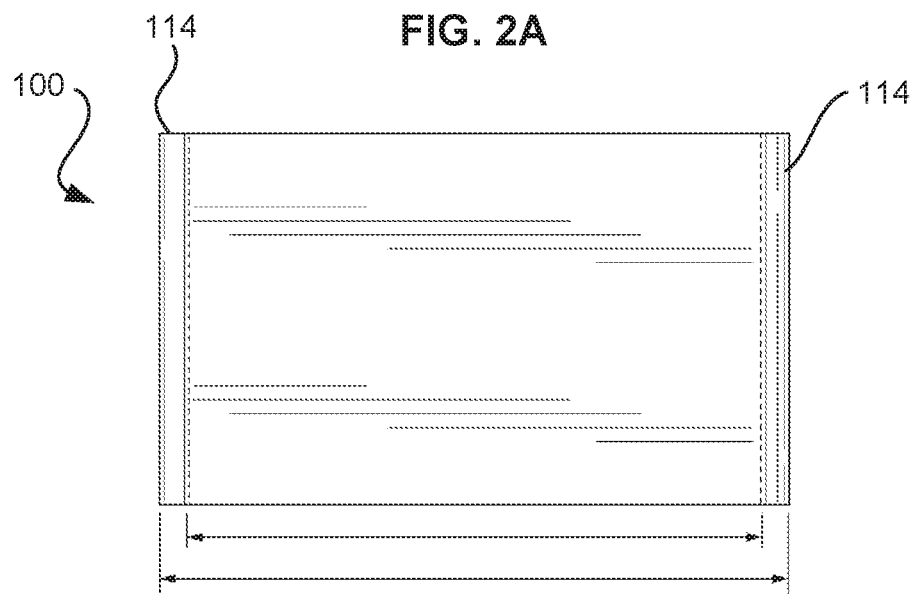
FIG. 2B is a top plan view of the example computing device of FIG. 1 with the display assembly closed against the base assembly.
Figure 2C:
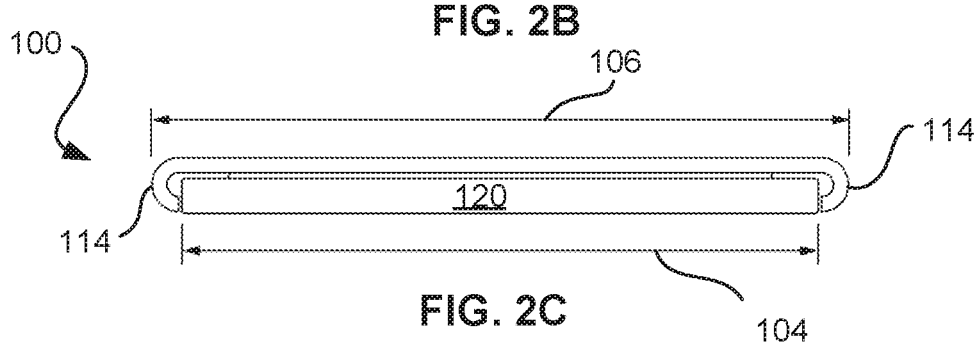
FIG. 2C is a side elevation view of the example computing device of FIG.1 with the display assembly closed against the base assembly.

The computing device 100 is shown with the display assembly 110 closed against the base assembly 120 in a plan view in FIG. 2B, and in a side elevation view in FIG. 2C. As can be seen in FIG. 2C, the peripheral display portions 114A, 114B are in the concealed positions, curled toward the base assembly 120. In other words, the peripheral display portions 114A, 114B are curved inward toward the computing device 100 when the computing device 100 is in the closed state. In other examples, the peripheral display portions 114A, 114B may be folded against a side of the base assembly 120. Thus, the peripheral display portions 114A, 114B in the concealed position may be curved, bent, curled, folded, furled, or otherwise concealed toward the base assembly 120.

Thus, concealing the peripheral display portions 114A, 114B when the computing device 100 is closed allows the computing device 100 to have an overall width 106 that is less than the width 102 of the display assembly 110 when the computing device 100 is opened. That is, the peripheral display portions 114A, 114B in the concealed positions decrease an overall width 106 of the computing device 100 when the main hinge 130 is rotated to close the computing device 100. Conversely, the orientations of the peripheral display portions 114A, 114B are adjusted to extend a width 102 of the display assembly 110 when the main hinge 130 is rotated to open the computing device 100, and orientations of the peripheral display portions 114A, 114B are adjusted to decrease an overall width 106 of the computing device 100 when the main hinge 130 is rotated to close the computing device 100. The peripheral display portions 114A, 114B extend a width 102 of the display assembly 110 when the peripheral display portions 114A, 114B are deployed in the viewing positions in which the peripheral display portions 114A, 114B are aligned with the main display portion 112.

Figure 3A:
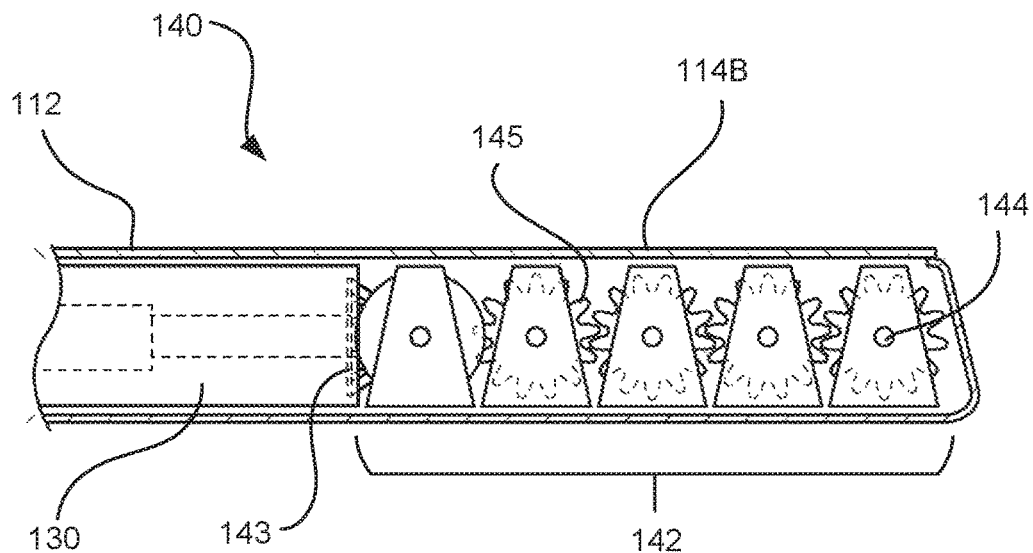
FIG. 3A is a cross-sectional view of the example display folding assembly of FIG. 1 in a flattened state, the cross-section taken along line 7-7 of FIG. 1.
Figure 3B:
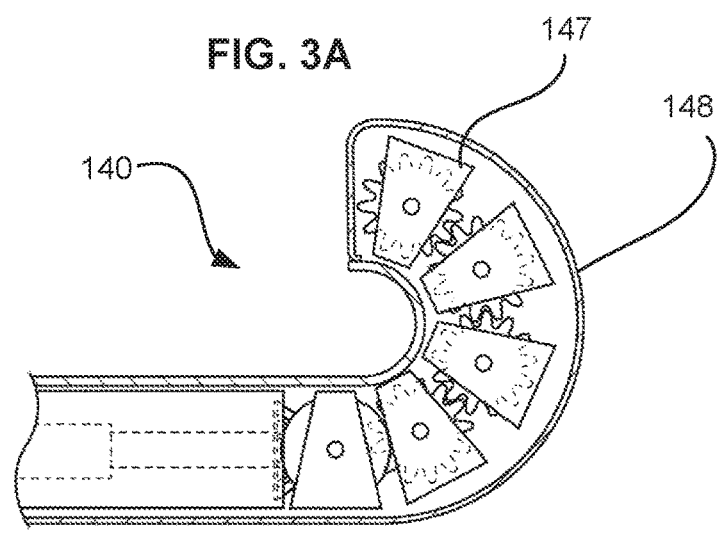
FIG. 3B is a cross-sectional view of the example display folding assembly of the FIG. 1 in a curved state.

FIG. 3A is a cross-sectional view of the peripheral display portion 114B and display folding assembly 140 that actuates the peripheral display portion 114B, with the peripheral display portion 114B deployed in the viewable state in which the peripheral display portion 114B is aligned with the main display portion 112 of the display assembly 110. The displaying folding assembly 140 is shown in FIG. 3A its flattened state, aligned with the main display portion 112. FIG. 3B is a cross-sectional view of the peripheral display portion 114B and display folding assembly 140, with the peripheral display portion 114B bent into the concealed position. The display folding assembly 140 is shown in FIG. 3B in its curved state, bent into the concealed position.

Figure 3C:
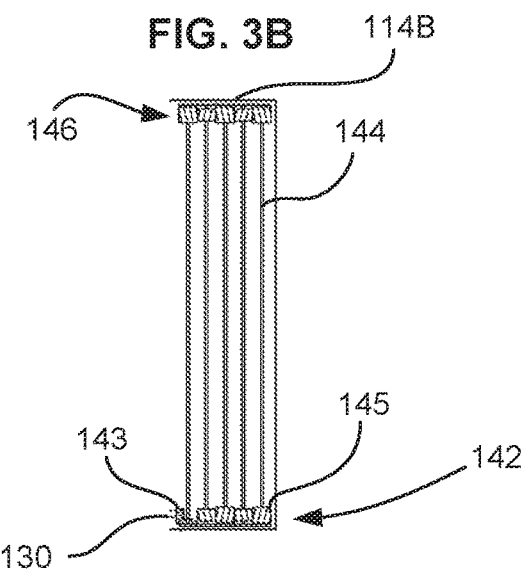
FIG. 3C is a front view of the example display folding assembly of FIG. 1.

The display folding assembly 140 includes a gear train 142 and a series of display folding hinges 144. The gear train 142 includes a bevel gear 143 to transfer rotation of the main hinge 130 about its axis to gears 145 which cause rotation of the peripheral display portion 114A, 114B. The gears 145 span along the width of the peripheral display portion 114B, and form what may be termed a peripheral gear train. The gear train 142 is rotationally coupled to the main hinge 130 to gradually bend the peripheral display portion 114B in response to rotation of the display assembly 110 about the main hinge 130. As shown in FIG. 3C, each gear 145 is rotationally coupled to a respective display folding hinge 144, which extend behind the height of the peripheral display portion 114B along the height of the display assembly 110. Each display folding hinge 144 may include a bar or shaft that extends behind the peripheral display portion 114B. The display folding assembly 140 may further include a series of structural members 147 to guide curvature of the peripheral display portion 114B.

The gear train 142 is located proximate to the main hinge 130, and thus may be referred to as a proximal gear train. As shown in FIG. 3C, the display folding assembly 140 may further include a distal gear train 146 opposite the gear train 142 with respect to the display folding hinges 144, located distal to the main hinge 130. The distal gear train 146 is rotationally coupled to the gear train 142 through the display folding hinges 144 to gradually bend a distal portion of the peripheral display portion 114B in response to motion of the gear train 142. As shown, the gear train 142 (proximal gear train) is located behind a proximal portion, or "bottom" portion, of the peripheral display portion 114B, and the distal gear train 146 is located behind a distal portion, or "top" portion, of the peripheral display portion 114B. Thus, as the gear train 142 (proximal gear train) gradually bends the proximal ("bottom") portion of the peripheral display portion 114B, the distal gear train 146 gradually bends the distal ("top") portion of the peripheral display portion 114B.

The display folding assembly 140 may include a cam to control the gear train 142 from deploying the peripheral display portion 114B past its viewable position. For example, the peripheral display portion 114B may be in its fully concealed position when the computing device 100 is closed, and the peripheral display portion 114B may be gradually deployed into its viewable position (e.g. being flat with the main display portion 112) as the computing device 100 is opened, or in other words, as the display assembly 110 is opened apart from the base assembly 120. The peripheral display portion 114B may reach its viewable position when the display assembly 110 is opened apart from the base assembly 120 at a threshold angle as determined by the cam. The cam may be designed so that this threshold angle is at about 45 degrees, about 90 degrees, about 135 degrees, or any other threshold angle. The threshold angle may be set at an angle at which a user is to use the computing device 100, or at a smaller angle, so that the peripheral display portion 114B is fully deployed when the user uses the computing device 100. Conversely, the cam may control the gear train 142 from bending the peripheral display portion 114B into its concealed position until the threshold angle is reached.

As best shown in FIG. 3B, the computing device 100 may include a peripheral rear cover 148 that bends with the peripheral display portion 114B to protect the peripheral display portion 114B. The computing device 100 may similarly include a peripheral rear cover 148 to protect the peripheral display portion 114A on the other side of the display assembly 110. Such peripheral rear covers 148 may be made of any flexible material.

Figures 4A, 4B:
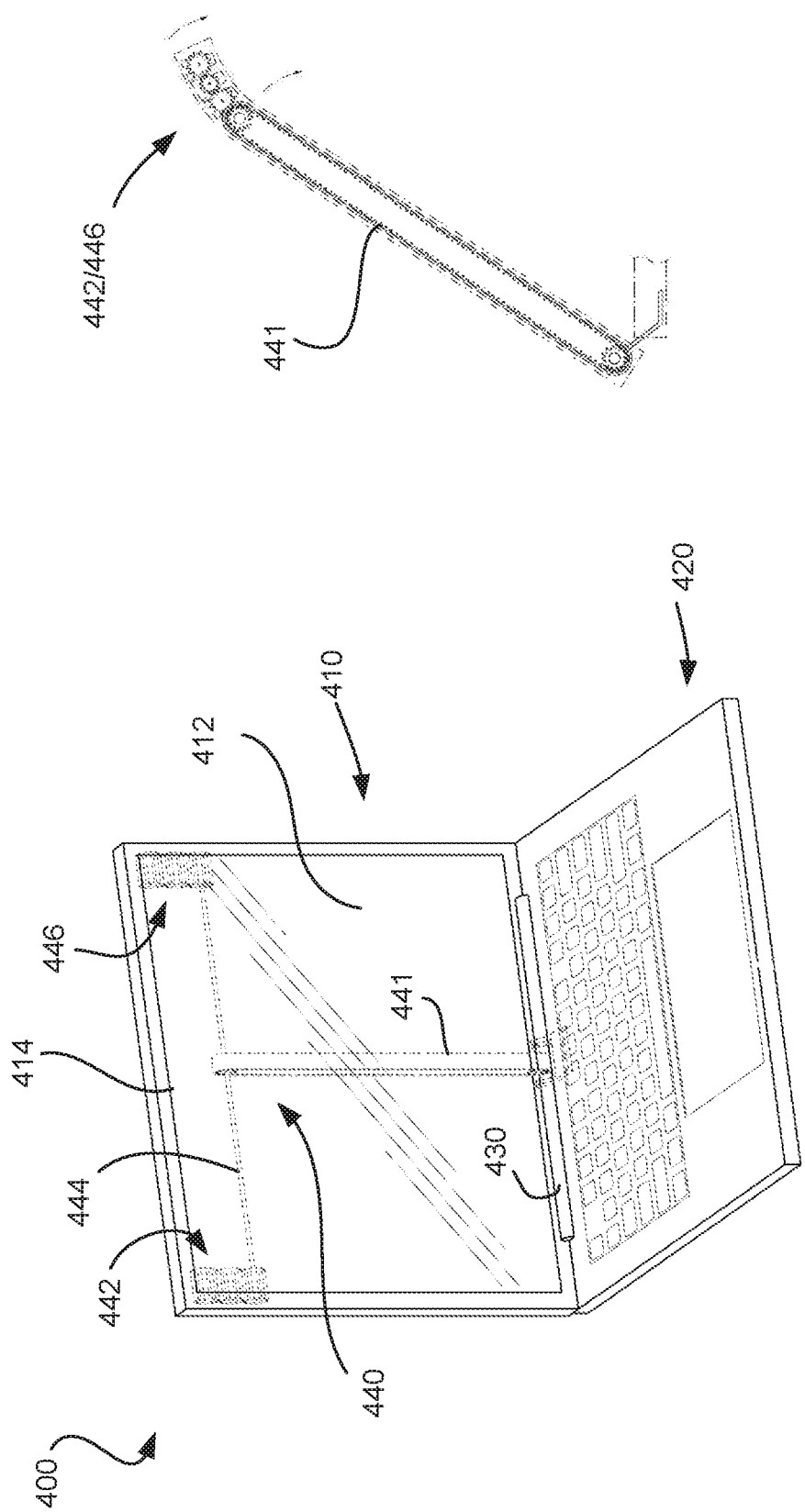
FIG. 4A is a perspective view of another example computing device with a flexible peripheral display portion, with another display hinge assembly shown in dotted lines.
FIG. 4B is a cross-sectional view of the display hinge assembly of the example computing device of FIG. 4A.

FIG. 4A is a perspective view of another example computing device 400. The computing device 400 is similar to the computing device 100 of FIG. 1, with like elements numbered in the "400" series rather than the "100" series, and thus includes a display assembly 410, base assembly 420, main hinge 430, display folding assembly 440, and main display portion 412. For further description of the above elements, reference to the computing device 100 of FIG. 1 may be had. FIG. 4B is a cross-sectional view of the display folding assembly 440 when the display assembly 410 is tilted toward closure.

In contrast to the computing device 100 of FIG. 1, the computing device 400 includes a peripheral display portion 414 that is located at a distal end (i.e. the "top" end) of the display assembly 410. The peripheral display portion 414 is alternately bent into a concealed position curled against the base assembly 420, and deployed into the viewable position, to extend the height of the display assembly 410.

Further, the display folding assembly 440 of the computing device 400 includes a belt gear 441 to alternately bend and deploy the peripheral display portion 414. The belt gear 441 is rotationally coupled to the main hinge 430 to actuate the peripheral display portion 414 accordingly. In other words, the peripheral display portion 114A, 114B extends the height of the display assembly 410 when the peripheral display portion 414 is aligned with the main display portion 412. The display folding assembly 440 further includes left- and right-side gear trains 442 and 446 and display folding hinges 444 which extend behind the peripheral display portion 414, which gradually bend the peripheral display portion 414 in response to rotation of the main hinge 430, as transmitted through the belt gear 441.

Thus, as described herein, a computing device may be provided with a display that offers a viewing space that is not constrained by the size of the body of the computing device. A computing device may be provided with a flexible display with a peripheral display portion which is concealed when the computing device is closed and deployed when the computing device is opened as a result of rotation of the main hinge of the computing device. The peripheral display portion is concealed to reduce the form factor of the computing device when the computing device is closed, and is deployed to increase a viewing space of the display when the computing device is opened. In effect, the computing device may have a screen-to-body ratio that is greater than 1:1:, since the viewing space of the display with the peripheral display portions deployed may be greater than the area of any side of the body of the computing device when the computing device is closed.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A computing device comprising:
a display assembly, a base assembly, and a main hinge to enable the display assembly to be closed against the base assembly, and to enable the display assembly to be opened apart from the base assembly;
the display assembly including a main display portion that overlaps the base assembly when the display assembly is closed against the base assembly, and a peripheral display portion that extends past an edge of the base assembly; and
a display folding assembly to:
bend the peripheral display portion into a concealed position in response to the display assembly being closed against the base assembly; and
deploy the peripheral display portion into a viewable position in response to the display assembly being opened apart from the base assembly;
wherein the display folding assembly comprises a gear train rotationally coupled to the main hinge to bend the peripheral display portion in response to rotation of the display assembly about the main hinge.

2. The computing device of claim 1, wherein the concealed position comprises the peripheral display portion curled toward the base assembly.

3. The computing device of claim 1, wherein the concealed position comprises the peripheral display portion folded against a side of the base assembly.

4. The computing device of claim 1, wherein the viewable position comprises the peripheral display portion parallel with the main display portion.

5. The computing device of claim 1, wherein the display folding assembly comprises a peripheral gear train extending behind the peripheral display portion to gradually bend the peripheral display portion.

6. The computing device of claim 1, wherein the gear train comprises a cam to control the gear train from deploying the peripheral display portion past the viewable position.

7. The computing device of claim 1, wherein the gear train comprises a proximal gear train rotationally coupled to the main hinge to bend the peripheral display portion in response to rotation of the display assembly about the main hinge, and a distal gear train rotationally coupled to the proximal gear train to bend a distal portion of the peripheral display portion in response to motion of the proximal gear train.

8. A computing device comprising:
a main hinge to open and close the computing device;
a display assembly including a main display portion, a first peripheral display portion, and a second peripheral display portion, the second peripheral display portion situated on an opposite side of the main display portion from the first peripheral display portion; and
a display folding assembly to adjust orientations of the first peripheral display portion and the second peripheral display portion relative to the main display portion based on movements of the main hinge;
wherein the display folding assembly comprises a gear train rotationally coupled to the main hinge to bend the first peripheral display portion and the second peripheral display portion in response to rotation of the display assembly about the main hinge.

9. The computing device of claim 8, wherein orientations of the first peripheral display portion and the second peripheral display portion are adjusted to extend a width of the display assembly when the main hinge is rotated to open the computing device.

10. The computing device of claim 8, wherein orientations of the first peripheral display portion and the second peripheral display portion are adjusted to decrease an overall width of the computing device when the main hinge is rotated to close the computing device.

11. A computing device comprising:
- a main hinge to enable the computing device to be unfolded from a closed state;
- a display assembly including a main display portion and a flexible peripheral display portion, the flexible peripheral display portion curved inward toward the computing device when the computing device is in the closed state; and
- a display folding assembly to align the flexible peripheral display portion with the main display portion as the computing device is unfolded from the closed state;
- wherein the display folding assembly comprises a gear train rotationally coupled to the main hinge to bend the flexible peripheral display portion in response to rotation of the display assembly about the main hinge.

12. The computing device of claim 11, wherein the flexible peripheral display portion aligned with the main display portion extends a width of the display assembly.

13. The computing device of claim 11, wherein the flexible peripheral display portion aligned with the main display portion extends a height of the display assembly.

14. The computing device of claim 11, wherein the computing device includes a peripheral rear cover that bends with the flexible peripheral display portion to protect the flexible peripheral display portion.

* * * * *